(12) United States Patent
Rodrigues De Oliveira et al.

(10) Patent No.: US 10,885,087 B2
(45) Date of Patent: Jan. 5, 2021

(54) COGNITIVE AUTOMATION TOOL

(71) Applicant: International Business Machines Corporation, Armonk, NY (US)

(72) Inventors: Luan Rodrigues De Oliveira, São Paulo (BR); Gerhardt J. Scriven, Indaiatuba (BR); Fabiana Carvalho Landgraf, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 16/189,069

(22) Filed: Nov. 13, 2018

(65) Prior Publication Data
US 2020/0151276 A1 May 14, 2020

(51) Int. Cl.
*G06F 16/35* (2019.01)
*G06F 16/31* (2019.01)
*G06F 16/38* (2019.01)

(52) U.S. Cl.
CPC ............ *G06F 16/35* (2019.01); *G06F 16/322* (2019.01); *G06F 16/358* (2019.01); *G06F 16/381* (2019.01)

(58) Field of Classification Search
CPC ...... G06F 16/381; G06F 16/358; G06F 16/35; G06F 16/322; G06N 20/00
See application file for complete search history.

(56) References Cited

U.S. PATENT DOCUMENTS

| | | | |
|---|---|---|---|
| 2009/0024647 A1* | 1/2009 | Hein | G06F 16/25 |
| 2014/0233719 A1 | 8/2014 | Vymenets et al. | |
| 2014/0282356 A1 | 9/2014 | Mills et al. | |
| 2016/0063081 A1* | 3/2016 | Rudolf | G06F 16/254 |
| | | | 707/602 |
| 2016/0070768 A1 | 3/2016 | DeRose | |
| 2017/0109933 A1 | 4/2017 | Voorhees et al. | |
| 2017/0132203 A1* | 5/2017 | Kim | G06F 16/35 |
| 2018/0103052 A1* | 4/2018 | Choudhury | G06F 21/566 |
| 2018/0114126 A1* | 4/2018 | Das | H04L 43/045 |
| 2018/0268076 A1* | 9/2018 | Gianetto | G06F 16/2365 |
| 2020/0074515 A1* | 3/2020 | Ghatage | G06Q 30/04 |
| 2020/0142999 A1* | 5/2020 | Pedersen | G06K 9/6263 |

* cited by examiner

*Primary Examiner* — James Trujillo
*Assistant Examiner* — Michael Bogacki
(74) *Attorney, Agent, or Firm* — Schmeiser, Olsen & Watts; Michael A. Petrocelli

(57) ABSTRACT

A requirements-traceability system extracts and classifies project requirements stored in a set of source documents. If a source document is unstructured, such as a natural-language word-processing file, the system uses a self-learning or cognitive natural-language tool to inferentially infer requirements in that document. Each requirement may be composed of more detailed sub-requirements in parent-child relationships. Requirements are reclassified into a standardized classification scheme and stored in a standardized hierarchical data structure in which each level corresponds to a requirement's relative degree of granularity. The tree is updated whenever requirements are revised, allowing users and downstream applications to bidirectionally trace each requirement's ancestors and descendants and to review and audit revision histories of the project's entire requirements hierarchy.

20 Claims, 6 Drawing Sheets

COGNITIVE AUTOMATION TOOL

BACKGROUND

The present invention relates in general to cognitive automation tools and systems-engineering tools and specifically to automated requirements-traceability technology and tools.

Requirements traceability applications are networked software tools that document and allow users to trace lifecycles of project requirements throughout the course of a project. Traceability systems decompose project requirements into a dynamic, hierarchical data structure and continuously refine that structure as requirements evolve from their original forms into formal specifications, are sustain subsequent revisions during project deployment and validation.

Downstream users and applications can also use this technology to dynamically trace and audit every change made to a requirement over the life of a project and to identify the effect of each change on other requirements and project tasks. This functionality provides important advantages to project managers, allowing them to identify the original sources of current requirements for labor, materials, time, or budget, to determine why and when an original requirement is no longer included in the latest version of a project, and to predict future effects that would be caused by revising a requirement at any past, present, or future point in a project timeline.

Traceability data structures may be created by capturing product requirement documents (or "PRDs") from structured source documents like databases, online forms, and project-management applications, and from unstructured or semi-structured sources like natural-language word-processing files and spreadsheet-application worksheets.

These source documents may be received from a variety of sources, including customers, managers, marketing professionals, and other types of producers and users associated with the goal of a project. PRDs may also be received in a variety of file formats and the content of these sources may be laid out, structured, or formatted in conformance with a variety of industry standards or conventions, or with a proprietary layout. In particular, hierarchically organized requirements may be organized into differently labeled levels or categories.

Known requirements-traceability systems may resolve these incongruities by manually extracting and formatting requirements from each source document (or "trace") in order to translate the extracted requirements into a standard format. This task is generally performed by human experts who possess experience and knowledge about project-related business issues, project-management procedures, and software systems used to generate the traces. In larger projects, which may comprise thousands of requirements and dependencies, a manual requirements-traceability effort can require numerous experts.

If using an application-lifecycle management (ALM) architecture to manage a project that doesn't need access to external or unstructured requirements sources, trace-retrieval can sometimes be automated by third-party custom-written requirements-gathering tools integrated into the ALM architecture. These solutions are limited to projects that don't need to access external or unstructured requirements sources and may be designed to import traces from only one type of source document or model.

SUMMARY

Embodiments of the present invention include methods, requirements-management systems, and computer program products that implement a method for a requirements-management system with a holistic traceability tree. A requirements-management system receives a set of trace documents that each contains information describing and classifying at least one requirement of a planned project, and that each uses a distinct classification scheme to classify requirements. The system extracts from each received document a set of project requirements, a classification of each extracted requirement that conforms to the classification scheme used by the document, and a list of parent-child relationships among the extracted requirements. The system reclassifies the extracted requirements according to a standardized reclassification scheme that sorts requirements into levels that each correspond to a different degree of granularity. The system organizes the reclassified requirements into a generalized hierarchy structured as a function of each requirement's relative degree of granularity. The system then translates the hierarchy into a traceability-tree data structure that may be integrated into downstream project-management systems. The tree may also be displayed to users by an interactive software tool, allowing users to perform operations like bidirectionally tracing the lineage of a requirement between a root node and a leaf node of the traceability tree, and automatically identifying orphan and hanger requirements caused by errors in an original trace document.

DETAILED DESCRIPTION

Figure 1:
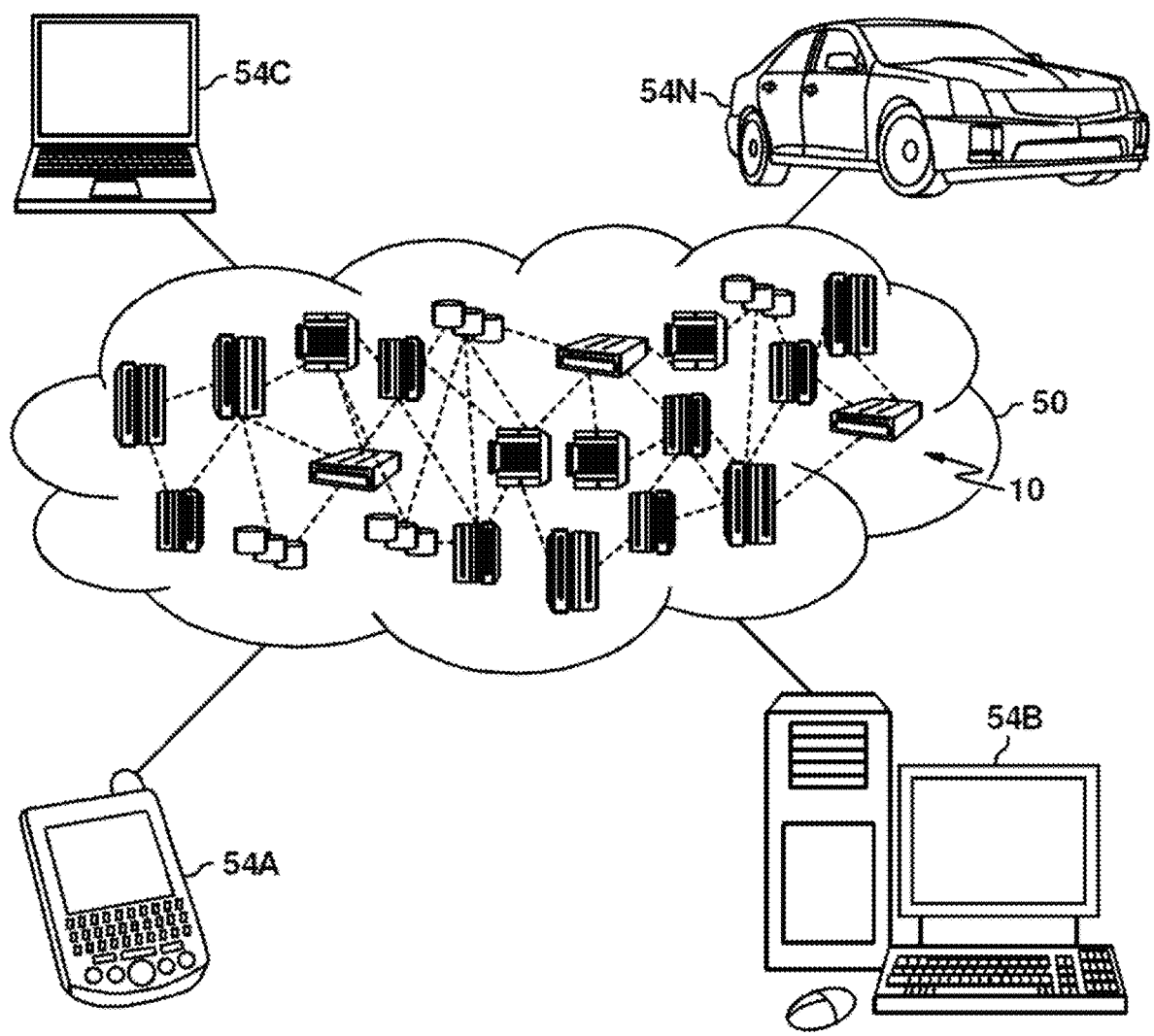
FIG. 1 depicts a cloud computing environment according to an embodiment of the present invention.

Requirements-traceability technology is an essential component of modern project-management systems. Large-scale projects directed toward designing and manufacturing complex products like aircraft, automobiles, public infrastructure, buildings, and consumer-electronics devices can comprise thousands of requirements, generally organized in a treelike hierarchy, in which each requirement can be decomposed into child requirements.

Popular requirements-management methodologies, such as the Agile methodology, which continuously revises requirements throughout the life of a project have made requirements traceability a mission-critical feature of project-management systems. Requirements-traceability applications are the most common tools for tracing and auditing the evolution of each requirement as a project progresses from initial planning stages through implementation and post-deployment maintenance.

Known requirements-traceability technologies suffer from a lack of flexibility that can result in the need for cumbersome manual procedures. Known requirements-management tools can automatically extract requirements from a trace (an original source document that specifies project requirements) only if that trace is formatted in a known structure, strictly adheres to a particular set of industry conventions, or has been generated in a known form by a known software application. Such requirements-management tools are generally able to handle only a small subset of possible input formats, and most are specifically written to extract requirements from traces created by a single proprietary application.

There is thus no known way to automatically identify, extract, and characterize requirements stored in a generalized input document that does not conform to a specific, highly structured format. Known requirements-management tools do not even attempt to extract requirements from unstructured documents, such as natural-language requirements descriptions stored in a text file or on a Web page.

This constraint significantly limits current requirements-traceability technology because large projects generally comprise requirements garnered by many different parties, some of which may be extrinsic to the business that is managing the project. For example, an automobile manufacturer designing a new sedan may collect requirements from: independent dealerships, domestic and overseas upper-level management, subcontractors that will be building subassemblies, a marketing-intelligence service conducting focus-group research, a manufacturer Web site that allows buyers to submit natural-language product "wish lists," and the business's own internal marketing and sales personnel.

Each of these parties may describe its requirements in a different format. Some traces may be formatted as structured documents, such as a table of a known database or a PRD that strictly conforms to the original Agile specification. But other traces may comprise unstructured documents received as word-processing files or HTTP or XML code, and yet others may label or classify requirements in a proprietary manner.

One reason why requirements-traceability technologies are useful is because they organize requirements by degree of granularity. For example, requirements can be classified by granularity, ranging from the broadest, least granular classification (a single requirement that comprises the entire project) to the narrowest, most granular (such as low-level system requirements that translate directly into actual implementation and deployment tasks). Embodiments of the present invention develop hierarchical "traceability tree" structures, in which each level of the tree contains nodes that represent requirements that share the same granularity classification.

In such embodiments, traces may use different naming conventions to identify granularity classifications. For example, a requirement that would be classified as a "System Requirement" in a traditional waterfall-type project would instead be labeled by the original Agile naming convention as an "EPIC" requirement. Because so many variations of waterfall, Agile, and hybrid "blended" methodologies exist, it can be hard to predict how a particular source document will have labeled each requirement. In other cases, traces may use inconsistent labels because the traces were generated by different business units or different companies, each of which owns different requirements-generation tools.

Known requirements-traceability technology cannot automate the integration of such heterogeneous traces, instead requiring human experts or specially written, proprietary software modules to process each trace. Identifying, extracting, and standardizing thousands of requirements under such conditions, and then repeating the procedure during each requirement update, can be enormously burdensome and vulnerable to error.

Embodiments of the present invention address these issues with an improved requirements-traceability technology that imports traces from a variety of structured and unstructured sources, extracts requirements definitions from each trace, classifies each requirement by the requirement's granularity, and organizes the resulting requirements into a dynamic, interactive traceability-tree data structure.

Methods and systems that implement this technology provide numerous technical advantages over existing requirements-traceability technologies. The improved technology can automatically import, analyze, and extract requirements from any sort of source, so long as the system knows the labeling convention used by that source to classify requirements by granularity.

The improved technology thus does not require a human expert to review, analyze, and manually extract and format requirements from each document. Nor is the improved technology limited to structured formats generated by proprietary requirements-management tools. A cognitive natural-language processing (NLP) component allows the improved technology to identify requirements in even an unstructured document and to then automatically extract and classify those requirements in a format that allows the requirements to be added to the dynamic traceability tree.

If an unstructured trace cannot be reliably analyzed, the NLP component may comprise self-learning capabilities that allow the component to learn from its errors. Using techniques and technologies like machine-learning, the component can learn to interpret similar unstructured documents in the future by comparing its previous attempts to identify content with the correct requirements extracted from the unstructured trace by other means. When implemented within a project-management technology that comprises continuously evolving requirements, this feature allows an embodiment to automatically extract requirements from subsequently updated versions of the unstructured source.

As mentioned above, embodiments generate traceability trees that represent requirements in a hierarchy, where each level of the tree contains nodes representing requirements classified as sharing the same degree of granularity. For example, a traceability tree that represents a hierarchical decomposition of a particular project's total requirements might represent the broadest statement of the overall project requirements as a Level 0 root node (the highest-level node of the tree). Each child of that node would occupy Level 1 of the tree and would be classified with the second-broadest level of granularity. Each of those child nodes could in turn parent a set of Level 2 child nodes that are classified with the next broadest degree of granularity. The most detailed, most granular requirement be represented by the tree's leaf nodes.

In this way, the traceability tree represents an entire hierarchy of project requirements as one or more nested hierarchies. This structure may be traversed, by means of known graph-traversal operations. in order to trace any particular requirement's parent and child nodes, from the highest-level requirement down to the lowest-level requirements comprised by the particular requirement.

Moreover, a traceability tree of this type can also reveal errors in requirements definitions that result in orphan or hanger requirements. An orphan requirement is easily identified in the tree as a node, other than the root node, that has no linkage to a parent node. Orphan requirements are problematic because they can consume resources without being logically connected to the root-level task.

Similarly, a hanger requirement is one that has not been fully decomposed to the highest level of granularity, indicating that the project plan has omitted a low-level requirement to perform actual work needed to implement the hanger requirement. A hanger requirement is easily identifiable in a traceability tree as a node, not located at the lowest level of the tree, that has no child nodes.

In summary, embodiments of the present invention improve upon current requirements-traceability technology by providing: i) a way to automatically import and manage requirements traces stored in a variety of formats, regardless of whether an imported trace complies with a recognized standard; ii) a way to automatically reconcile differences in the labeling and classifications of imported requirements; iii) a flexible dynamic traceability tree that can be used to trace the ancestors and descendants of any decomposed requirement and to audit such traces over time throughout the lifecycle of a project, iv) a tool for quickly identifying requirements errors that result in orphan and hanger requirements.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
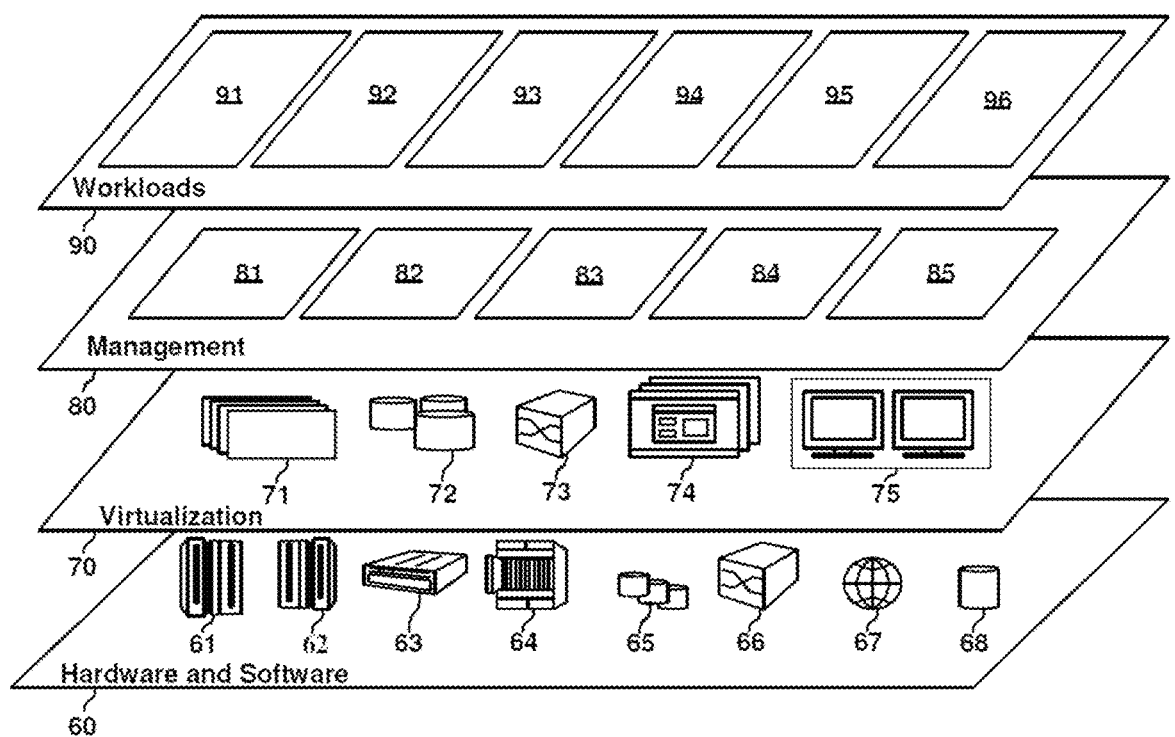
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of complex methods, systems, and computer program products for a requirements-management system with a holistic traceability tree.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
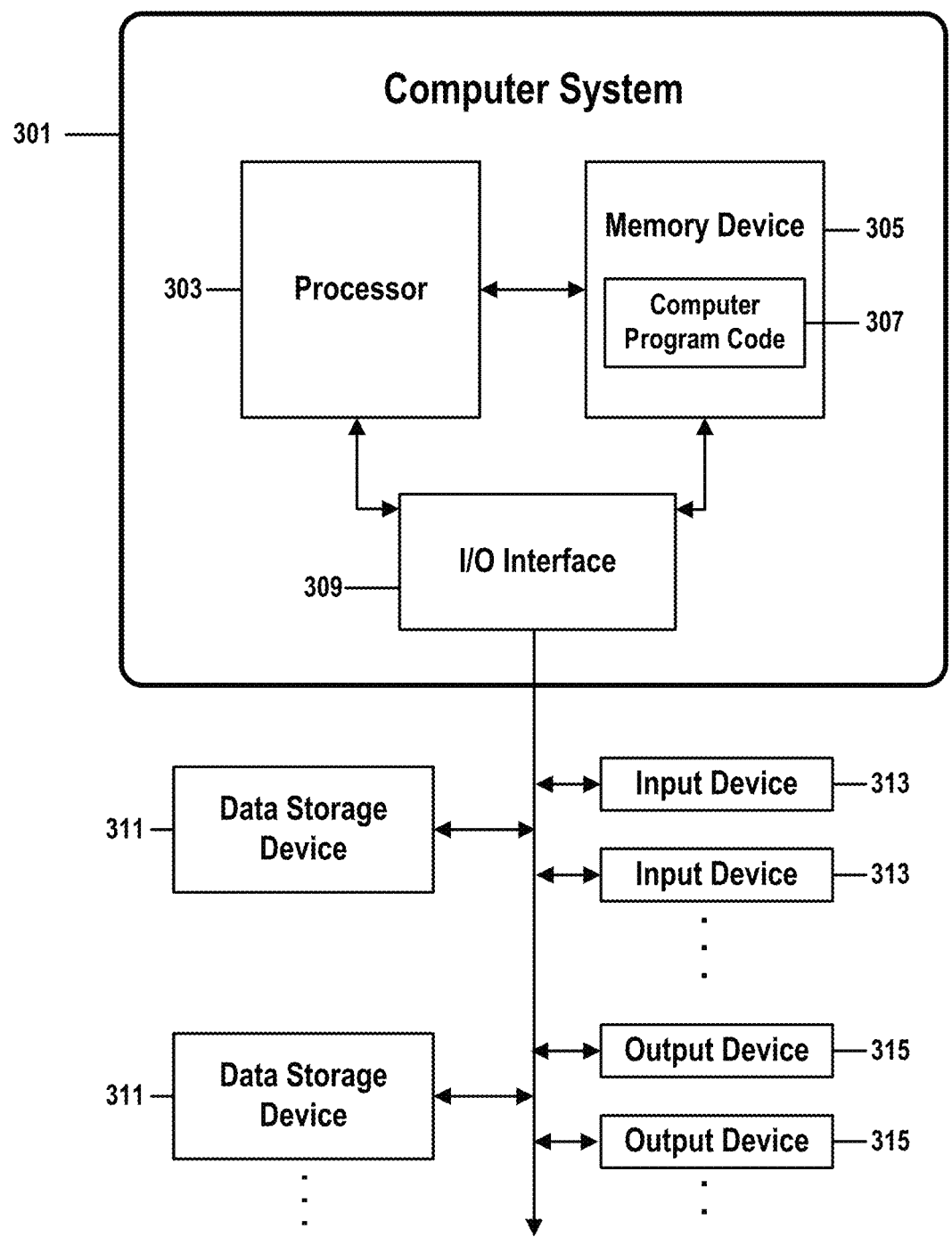
FIG. 3 shows the structure of a computer system and computer program code that may be used to implement a method for a requirements-management system with a holistic traceability tree in accordance with embodiments of the present invention.

FIG. 3 shows a structure of a computer system and computer program code that may be used to implement a method for a requirements-management system with a holistic traceability tree in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for a requirements-management system with a holistic traceability tree in accordance with embodiments of the present invention, and may implement other embodiments described in this specification, including the methods illustrated in FIGS. 1-6B. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware 305, or may be accessed by processor 303 directly from such firmware 305, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for a requirements-management system with a holistic traceability tree.

Any of the components of the present invention could be created, integrated, hosted, maintained, deployed, managed, serviced, supported, etc. by a service provider who offers to facilitate a method for a requirements-management system with a holistic traceability tree. Thus the present invention discloses a process for deploying or integrating computing infrastructure, comprising integrating computer-readable code into the computer system 301, wherein the code in combination with the computer system 301 is capable of performing a method for a requirements-management system with a holistic traceability tree.

One or more data storage units 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 307 for a method for a requirements-management system with a holistic traceability tree may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for a requirements-management system with a holistic traceability tree is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4:
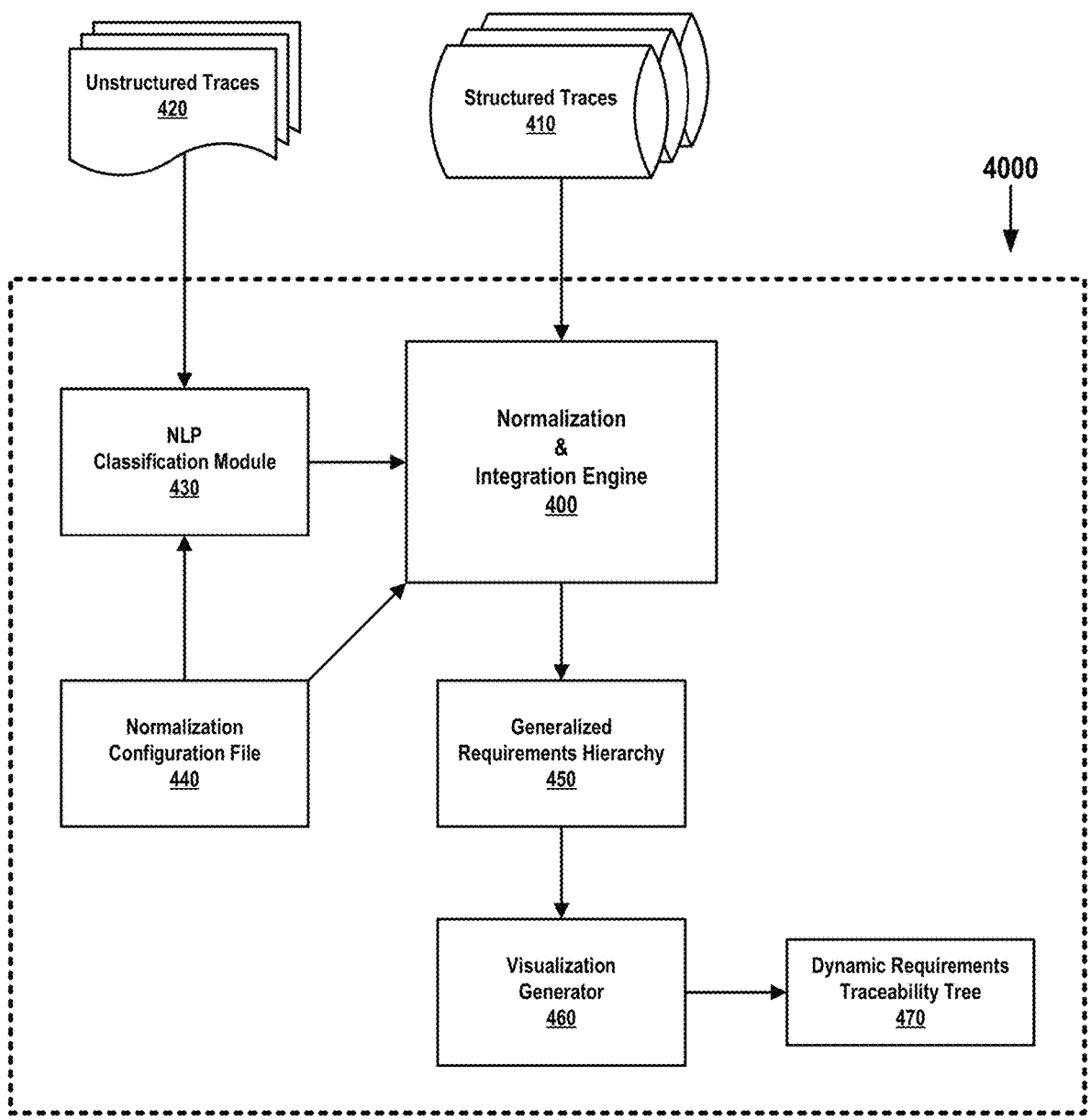
FIG. 4 shows a logical structure of an improved requirements-management system in accordance with embodiments of the present invention.

FIG. 4 shows a logical structure of an improved requirements-management system 4000 in accordance with embodiments of the present invention. FIG. 4 shows items 4000 and 400-470, which may be implemented on platforms incorporating elements of FIGS. 1-3.

System 4000 receives trace documents 410-420 that each contain descriptions of project requirements. In some embodiments, each trace 410-420 includes:

i) an identification of one or more requirements;

ii) a classification of each requirement that specifies that requirement's degree of granularity. Each trace 410-420 may use its own system of categorizing or classifying requirements, but in all cases, each classification will specify a particular level of breadth or detail, ranging from broad, high-level requirements down to narrow details;

iii) an indication of parent-child relationships between pairs of the identified requirements that allow the requirements to be organized into a hierarchy like the generalized requirements hierarchy 450 or a traceability tree 470. A requirement at one level of such a hierarchy may be decomposed into a set of sub-requirements at the next-highest level. For example, in a house-construction project, a parent requirement to build a kitchen at one level of the hierarchy could be decomposed into forty higher-granularity child requirements (such as preparing blueprints, installing cabinetry, electrical work, plumbing work, and installing appliances) at the next-highest level. Each child requirements could in turn be decomposed into grandchild requirements one level lower than the level of the child requirements. For example, an "installing appliances" child requirement could be decomposed into even more granular requirements like taking measurements, choosing a refrigerator model, choosing a stove model, scheduling delivery dates, and physically installing delivered units.

Classifications may be associated with corresponding degrees of granularity through any method known in the art. For example, persons skilled in the art of project management may prefer to use known conventions and standards to sort requirements into commonly used granularity-based categories like "High-Level Business Requirements," "Low-Level Business Requirements," "High-Level System Requirements," and "Low-Level Business Requirements. Although some implementers will prefer to adopt such common industry practices when deciding how to organize requirements into categories based on relative degrees of granularity, embodiments of the present invention are flexible enough to accommodate any sort of generalized classification scheme desired by an implementer.

A structured trace 410 may be formatted as one or more data structures in which the location of a data element within a data structure indicates the meaning of that element. Examples of such data structures include spreadsheet worksheets, database tables, and electronic forms.

An unstructured trace 420 contains similar information, but does not organize the information into a known structure. For example, a word-processing document may contain an embedded chart or list that enumerates the information described above, but is not itself a database table that stores each data element in a semantically meaningful column.

System 4000 addresses this issue with a natural-language classification module or service 430. Classification module 430 analyzes each unstructured source document 420 in order to infer semantic meaning to unstructured text that is determined to describe requirements.

Classification module 430 may be implemented as an independent application called by other components of system 4000, an intrinsic component of system 4000, a third-party service, or any other type of entity known in the art.

Classification module 430 may identify and retrieve requirements from unstructured traces 420 through known combinations of any technologies and methodologies known in the art. These technologies and methodologies range from simple pattern-matching and keyword-searching procedures to cognitive and artificially intelligent methods like semantics analytics or text analytics.

Classification module 430 may be a self-learning application that remembers how successfully it has inferred requirements from unstructured documents in the past and learns from those experiences how to more accurately interpret similar documents in the future. This self-learning procedure may be implemented by any technology desired by an implementer, such as through a method of machine-learning in which records of previous attempts to extract requirements from an unstructured trace are incorporated into a machine-learning corpus that is used to train classification module 430.

In some embodiments, classification module 430 may also use rules stored in a normalization configuration file 440 to classify each requirement extracted from an unstructured trace 420. These rules may identify labels or classification schemes that are known to be used by each type of unstructured trace 420 to classify requirements. These rules may also be used to help train classification services 430 that are configured with self-learning capabilities.

In one example, consider an unstructured trace 420, received from a company's Global Sales organization, that contains the below natural-language text:

Sales 2.1: We must be able to sell our products in all Portuguese-speaking markets worldwide.

AppB 1.2.4: Our sales offices should only use the Rev. 4.01b forms when printing invoices in Portuguese.

AppB 1.2.4.1: The translation table published in Appendix B of the January 2019 Sales Procedures Manual should be used to convert standard English terms to Portuguese for all line items that appear on the invoice.

Using known techniques ranging from simple keyword-matching to cognitive semantic analytics, classification module 430 might first identify each of these three statements as specifying a requirement. Referring to classification rules defined for Global Sales traces in configuration file 440 (or, in some embodiments, relying on past experience interpreting unstructured Global Sales traces), classification module 430 interprets each statement's leading text and numeric identifier as a classification and granularity level of that statement's natural-language requirement.

In the current example, configuration file 440 could identify six degrees of granularity, each of which corresponds to a particular classification label and to a distinct level of a hierarchy. Here, a numeric identifier that contains one decimal point would be interpreted as a classification label corresponding to Level 2 of the hierarchy, an identifier with two decimal points would correspond to a Level 3 classification, and an identifier with three decimal points would be interpreted as a Level 4 classification. "Sales 2.1" would thus identify the first statement as a Business Requirement located on Level 2 of a traceability tree, "AppB 1.2.4" would identify the second statement as a System Requirement located on Level 3 of the tree, and "AppB 1.2.4.1" would identify the third statement as a Detailed Functional Requirement located on Level 4 of the tree.

Parent-child relationships may be inferred by other rules stored in the configuration file 440, or maintained by a self-learning classification module 430 in that module's internal knowledgebase. These rules might define a hierarchical outline-like numbering system that would identify the second requirement, labeled as "AppB 1.2.4," to be the parent of the third requirement, which is labeled as "AppB 1.2.4.1."

Embodiments of the present invention are flexible enough to accommodate any rules, labels, and classification schemes desired by an implementer. The above example should not be construed to limit embodiments to a particular classification methodology, organizational plan, or labeling convention. The stored rules must, however, describe how to interpret specific types of character strings in order to identify requirements statements, classify each requirement with a particular level of granularity, and organize the requirements into parent-child relationships.

The classification module 430 forwards the extracted requirements, classifications, parent-child relationships and any associated information to a Normalization & Integration (N&I) Engine 400 that aggregates and processes this information into the generalized requirements hierarchy 450.

System 4000 uses a simplified version of this method to extract requirements from structured traces 410 without inferential or natural-language processing. Normalization & Integration Engine 400 instead merely retrieves the contents of a structured trace 410, where meaning may be associated to each extracted data element as a function of the location within the structure in which the element is stored. For example, columns of a first database table might respectively contain: an indexable requirement identifier, a classification label, a natural-language description of the requirement, and a pointer to a second table that lists identifiers of child requirements.

Like classification module 430, N&I engine 400 may use rules stored in configuration file 440 to interpret data elements stored in a particular structured trace 410. For example, one set of rules might tell N&I engine 400 where information identifying requirements, classifications, granularity levels, and parent-child relationships would be stored in data structures generated by a domestic Marketing Department system. These rules would also list the textual labels and granularity levels associated with each classification. But a second set of rules would be required to identify the same information for structured traces 410 received from an overseas subsidiary's manufacturing database, if that database produces a different data structure or uses a different classification scheme than does the domestic system.

In some embodiments, certain of the classification operations described above as being performed by classification module 430 may instead be performed by normalization & integration engine 400. In one example, classification module 430 would use inferential methods to merely identify requirements and classifications stored in an unstructured trace 420. In this case, classification module 430 would then forward the identified requirements and classifications to N&I engine 400, allowing the N&I engine 400 to associate each requirement with a granularity level or standardized reclassification label used by the generalized hierarchy 450. This slightly different division of functionality between the two modules would not change the overall functionality or underlying inventive concept of system 4000.

Engine 400 aggregates and merges requirements and classifications extracted from structured traces 410 and received from classification module 430 into the holistic, integrated generalized requirements hierarchy 450. Requirements stored in hierarchy 450 are organized into a generalized classification scheme that comprises a standardized set of classifications, each of which is associated with a standardized label and level of granularity.

Visualization generator 460 is a software module that translates the generalized hierarchy 450 into the dynamic requirements-traceability tree 470 described above.

Figure 5:
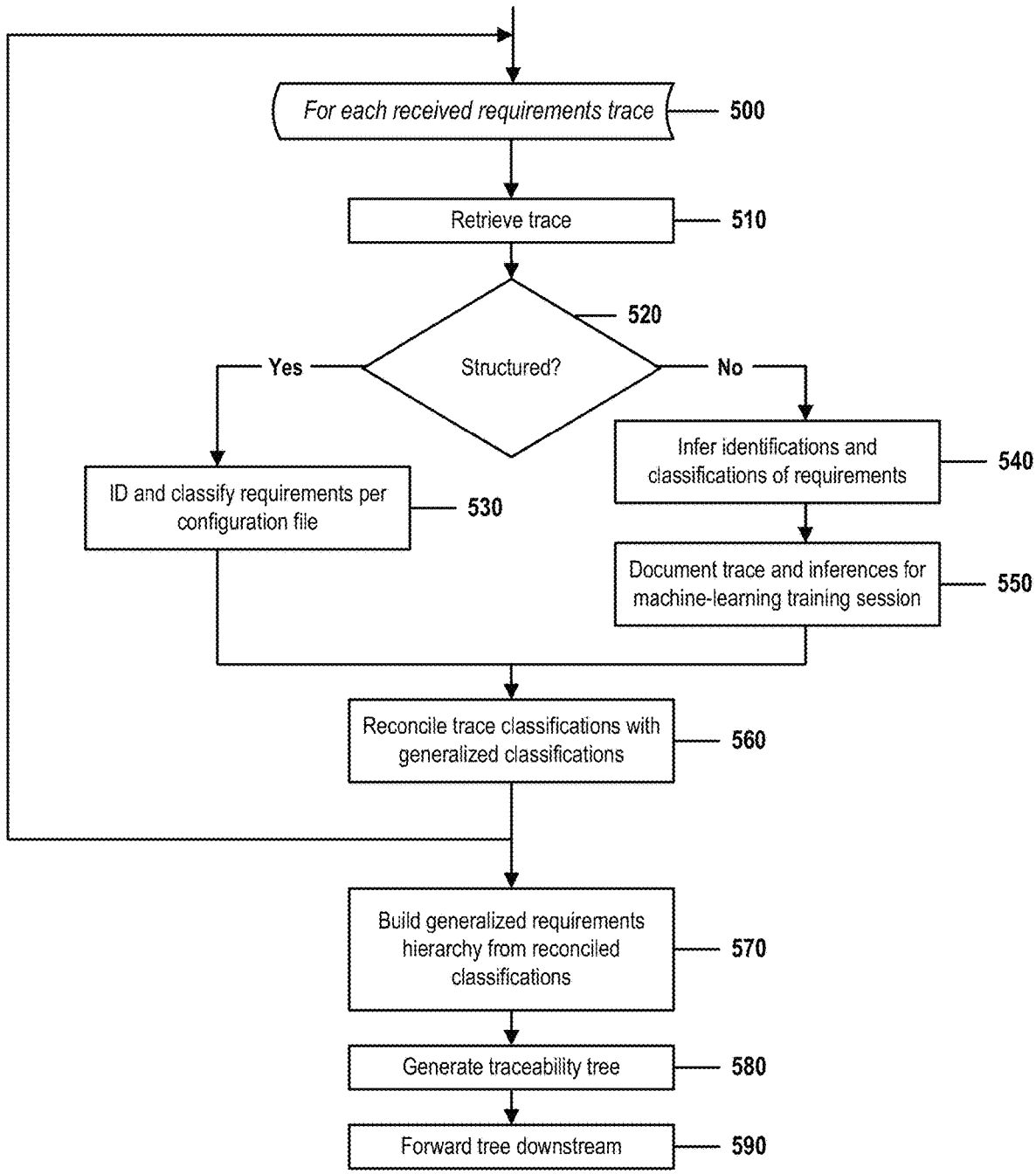
FIG. 5 is a flow chart that illustrates the steps of a method for an improved requirements-management system in accordance with embodiments of the present invention.

FIG. 5 is a flow chart that illustrates the steps of a method for an improved requirements-management system in accordance with embodiments of the present invention. FIG. 5 contains steps 500-590, which are performed by logical entities shown in FIG. 4 on a computerized platform described in FIGS. 1-3.

Step 500 initiates an iterative procedure of steps 500-560, which is repeated for each requirements trace 410 or 420 that is to be processed.

In step 510, requirements-management system 4000 receives a structured requirements trace 410 or unstructured requirements trace 420.

In step 520, determines whether the received trace is a structured document or an unstructured document. FIG. 4 defines and illustrates examples of structured and unstructured documents, as the terms are used here.

If system 4000 determines in step 520 that the most recently received trace is structured, the method of FIG. 4 performs step 530. If system 4000 determines in step 520 that the most recently received trace is unstructured, the method of FIG. 4 instead performs steps 540 and 550.

In step 530, the normalization & integration (N&I) engine 400 component of system 4000 analyzes and extracts a list of project requirements and associated information from received structured trace 410. As described above, structured trace 410 is received in the form of a known data structure in which specific data items are stored at known, predetermined locations. N&I engine 400 thus identifies each extracted requirement, requirement classification, identifier of a parent and child relationships between a pair of requirements, and other related data items by identifying the data-structure location at which each data item is stored.

The N&I engine 400 may be a self-learning or cognitive application that maintains a set of rules or a knowledgebase describing the data structure comprised by the received trace 410. Alternatively, these rules could be stored in a normalization configuration file 440. In either case, the stored rules identify the data items stored at each location in the data structure and optionally identify classification and labeling conventions used to associate each stored requirement with a level of granularity.

In step 540, a natural-language processing (NLP) classification module or service 430 receives and analyzes an unstructured trace 420 received in step 510. As described in FIG. 4, classification module 430 uses a combination of known technologies and techniques to infer semantic meaning to unstructured text comprised by trace 420.

These known technologies and techniques may comprise noncognitive methods, such as keyword-matching and cognitive or artificially intelligent methods, such as semantic analytics. In some embodiments, classification module 430 is a self-learning application that continues to gain proficiency in the interpretation of unstructured traces 420.

Classification module 430 performs this task by referring to rules and other information stored in an internal knowledgebase or in the normalization configuration file 440. In either case, the stored rules identify classification labels, associated levels of granularity, and other elements of information that are likely to be comprised by unstructured traces 420 received from a particular source.

For example, one set of rules in configuration file 440 might specify that unstructured traces 410 received from a particular third-party market-research firm classify requirements into a four-tier hierarchy:

| Level | Classification | Classification Label |
|---|---|---|
| 0 | Capability requirements | C##.## |
| 1 | Business requirements | B##.##.## |
| 2 | System requirements | S##.##.##.## |
| 3 | High-level design requirements | H##.##.##.## |

In this example, classification engine 430 could identify classifications by the specified labels and associate each classified requirement with a corresponding hierarchical level of granularity. Other rules might further specify that the numbering system suggested by the labels could be used (as in the example of configuration file 440 described in FIG. 4), to organize requirements into parent-child relationships. These relationships could be used to determine which lower-level requirements are generated by the decomposition of a higher-level requirement and to accurately place each requirement into the generalized hierarchy 450.

Embodiments of the present invention can accommodate any such classification system desired by an implementer or required by the producer of an unstructured trace 420, regardless of the number of classifications in the hierarchy or the labels or numbering system used to distinguish each classification.

Rules stored in a knowledgebase or in configuration file 440 may be structured or stored in any format known in the art, such as triplet vectors common to artificial-intelligence knowledgebases, proprietary pseudocode, or common programming or scripting languages like Extensible Markup Language (XML) or JavaScript Object Notation (JSON).

At the conclusion of this step, classification module 430 forwards to N&I engine 400 the requirements, classifications, and associated information extracted from the unstructured trace 420. This forwarded information is comparable to the information that is extracted by the N&I engine 400 itself from structured traces 410.

In step 550, self-learning embodiments of NLP classification module 430 record information about the analytical or inferential operations of step 540. This information includes characteristics of unstructured source 420, information inferred from the source 420, and rules used to perform these inferences. The recorded information may be used during subsequent machine-learning training sessions to further train the self-learning classification module 430, or to update stored configuration rules that govern the operation of classification module 430. These sessions may augment the recorded information with identifications of errors made by the classification module 430 when attempting to assign semantic meaning to the unstructured trace 420 and with identifications of corrections to those errors.

In step 560, the N&I engine 400 reconciles to a common format the classifications and related information extracted from the trace 410 or 420 received in step 510. This common format is a set of classifications, each associated with a particular level of granularity, that are used by the generalized requirements hierarchy 450. These reconciliation procedures are shown in greater detail in FIGS. 6A and 6B.

Step 570 may create a generalized requirements hierarchy 450 once requirements and classifications have been extracted from all incoming traces 410 and 420 and subsequently mapped onto a standardized hierarchy; or step 570 may be performed iteratively, adding each incoming trace's requirements and classifications to an existing hierarchy 450 as the incoming trace is received.

Figure 6A:
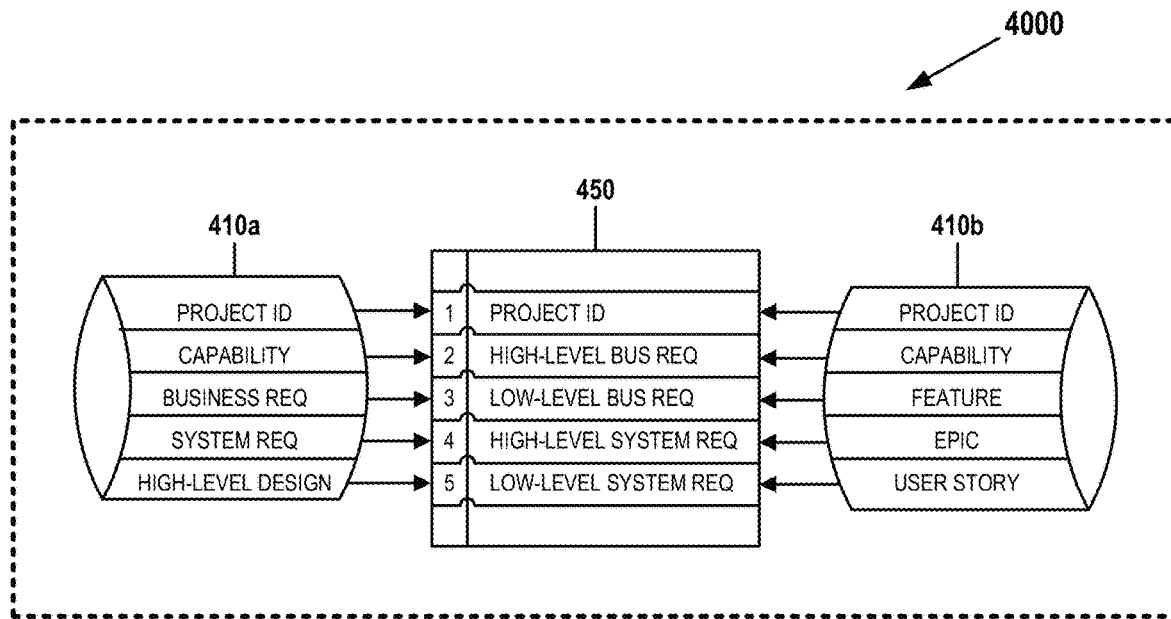
FIG. 6A illustrates an exemplary mapping of requirements extracted from structured traces onto a generalized requirements hierarchy, in accordance with embodiments of the present invention.
Figure 6B:
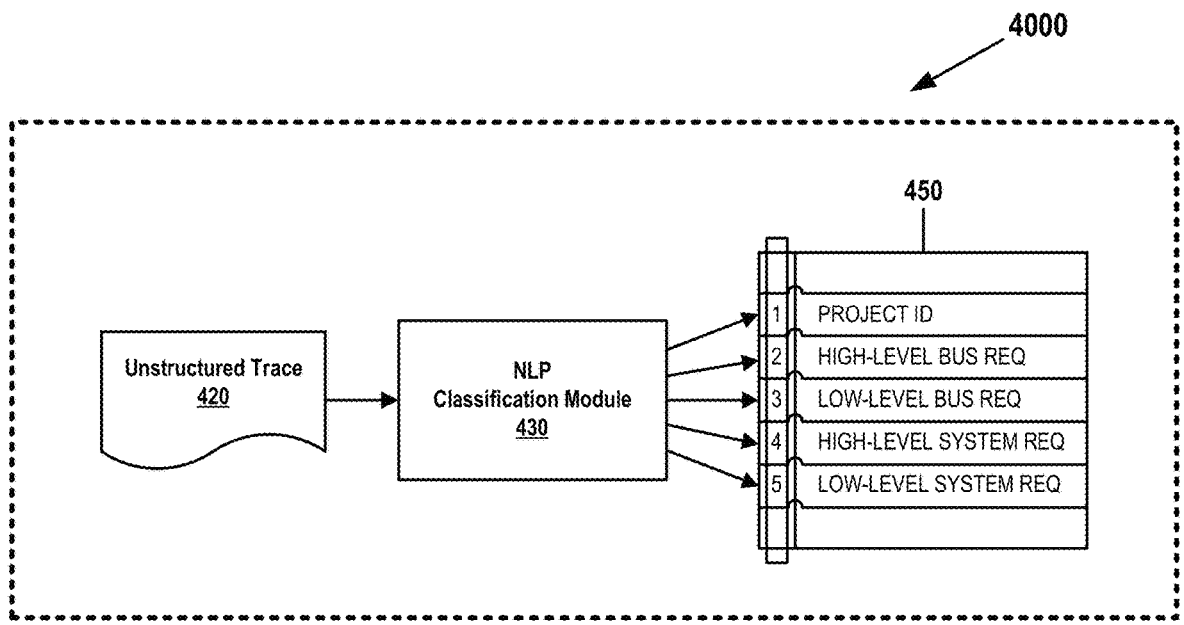
FIG. 6B illustrates an exemplary mapping of requirements extracted from structured traces onto a generalized requirements hierarchy, in accordance with embodiments of the present invention.

In either case, system 4000 aggregates and merges the extracted requirements and classifications, in the standardized form generated in step 560, into the single, holistic hierarchy 450, which organizes every extracted requirement into to a consistent classification system. As shown in FIGS. 6A and 6B, this hierarchy assigns each requirement to a particular standardized level as a function of the requirement's standardized reclassification.

At the conclusion of step 570, system 4000 will have created a generalized requirements hierarchy 450 that organizes all requirements extracted from received traces 410 or 420 into a standardized form. Each requirement will have been located in hierarchy 450 so as to correctly represent any parent-child relationship of which the requirement is a part.

Each standardized hierarchical level of hierarchy 450 may comprise many requirements and, in some embodiments, a standardized level may itself contain subtrees. For example, a requirement classified as a high-level business requirement may decompose into four lower levels of requirements (that is, a four-level subtree), all of which may also be considered to be high level business requirements. A requirement at the lowest level of the subtree may in turn be decomposed into another set of requirements classified as low-level business requirements. In this example, both the first requirement and its subtree would be classified with a first degree of granularity because both the parent requirement and all requirements of the subtree have similar enough levels of granularity to be classified as high-level business requirements. However, the requirements decomposed from the lowest level of the subtree are classified as low-level business requirements because they are deemed to have a qualitatively greater degree of granularity.

The point of this example is to illustrate that, although a generalized requirements hierarchy 450 might organize requirements into four, six, or eight levels, each of which is characterized by a corresponding classification, the hierarchy itself may contain tens of thousands of requirements, comprising hundreds of levels. The classification system of hierarchy 450 does not assign a distinct classification to every level of the hierarchy tree. Instead, it identifies layers, each of which may comprise entire subtrees of requirements, such that all requirements in a particular layer may be characterized as possessing a degree of granularity falling into a range associated with that layer's classification. The present invention is flexible enough to accommodate embodiments comprising any sort of hierarchical classification system of this nature, whether the system organizes hundreds of levels of nodes into a handful of broad, heavily populated granularity ranges, or whether it specifies a larger number of classifications, each of which contains a smaller number of nodes that have greater similarity of granularity.

In some embodiments, each requirement in the hierarchy is time-stamped, where the time-stamp identifies a time at which a trace 410 or 420 was received, a time at which a trace 410 or 420 was created, a time at which a requirement was originally entered into a trace 410 or 420, or any other time or date that an implementer deems relevant.

If system 4000, during the current or during a subsequent performance of the method of FIG. 4, receives a revised version of a previously received requirement that is already stored at a particular location in hierarchy 450, some embodiments will add the revised requirement to the same logical location, but with a later time stamp. In such embodiments, current real-time requirements-operations, which trace a requirement through its ancestors and descendants in the hierarchy, may by default consider only the version of the requirement with the latest time-stamp. But other functions, such as an ability to perform what-if analyses or to audit prior revisions of the requirements tree, may instead consider earlier versions of a requirement.

In step 580, system 4000 translates the logic comprised by the generalized requirements hierarchy 450 into a dynamic requirements-traceability tree 470. This translation may be performed by a visualization generator 460 component of system 4000 or may be performed by other modules of the requirements-management system 4000, such as the N&I engine 400.

In step 590, the visualization generator 460 may display traceability tree 470 to a user on a monitor, mobile device, or other viewing mechanism, or may forward traceability tree 470 to a downstream application capable of integrating the tree's underlying logic into a computerized model of the project or to another software application that maintains a budgetary, functional, business, or other type of model associated with the project. In embodiments where requirements-management system 4000 is merely one component integrated into an overarching project-management suite, visualization generator 460 my in this step forward a logical representation of tree 470 to a variety of budgeting, scheduling, resource-management, and other modules of the suite.

Either the visualization generator 460 or a downstream application may display the traceability tree 470 as an interactive two-dimensional hierarchy upon which users may perform various operations and from which users may generate various reports. These operations may include the ability to automatically decompose any requirement on the screen, to visually trace the path of a requirement backwards to the highest-level root node or forwards to any leaf node descended from the requirement, to perform "what-if" analyses that show how a proposed change to a requirement affects other branches of the tree, or to automatically identify orphan or hanger requirements.

Embodiments may also provide useful display and analysis features, such as the ability to identify the trace from which a requirement was originally derived, to display revision information for a requirement that has been updated and illustrate how each update altered other portions of the tree, to graphically indicate which requirements were inferred from unstructured traces 420, and so forth.

Information and logic comprised by the traceability tree 470 may also be used to create reports in either graphical or textual form. Such reports may include a two-dimensional tree-structure representation of traceability tree 470, linkage diagrams or listings that show parent-child relationships between a requirement and the sub-requirements into which the requirement may be decomposed, error reports identifying orphan and hanger requirements or requirements that fail to satisfy some other condition (such as age), and so forth. These reports may be formatted and delivered in any format preferred by an implementer, such as being printed or plotted in hardcopy, viewed with a Web browser, or accessed by a word-processing, spreadsheet, graphics-editing, image-viewing, or other type of application.

FIG. 6A illustrates an exemplary mapping of requirements extracted from structured traces 410 onto a generalized requirements hierarchy 450, in accordance with embodiments of the present invention. FIG. 6A shows items 4000, 410a, 410b and 450.

In this example, a first structured trace 410a has been identified as describing five classes of requirements, each of which corresponds to a distinct level of granularity. At the top is the "PROJECT ID" classification, which identifies a broadest requirement that describes the entire project. The PROJECT ID requirement can be decomposed into a set of child "CAPABILITY"-classified sub-requirements, each of which has greater degree of granularity than the PROJECT ID requirement.

Similarly, each CAPABILITY requirement may be decomposed into a set of "BUSINESS REQUIREMENT" requirements with a next-greater degree of granularity, each BUSINESS REQUIREMENT requirement may be decomposed into a set of "SYSTEM REQUIREMENT" requirements that have a next-greater degree of granularity, and each SYSTEM REQUIREMENT requirement may be decomposed into a set of "HIGH-LEVEL DESIGN" requirements that have the greatest degree of granularity. Each classification may comprise numerous requirements that are themselves organized into hierarchies nested within the classification level.

A second structured trace 410b, which conforms to the original Agile model, also identifies five classes of requirements, but although the five classes roughly correspond to the five classifications of trace 410, the two classifications do not employ the same classification labels. The five requirement classifications of structured trace 410b are, in order of increasing granularity, "PROJECT ID," "CAPABILITY," "FEATURE," "EPIC," and "USER STORY."

In the method of FIG. 5, components of requirements-management system 4000 map reconcile differences between each trace's classification scheme by mapping each requirement extracted from a trace into a generalized set of classifications used by generalized hierarchy 450.

Here, as shown in FIG. 6A, requirements extracted from structured trace 410a are each mapped into a corresponding level of generalized hierarchy 450. This mapping is performed by correlating levels associated with each classification of trace 410a with levels associated with each standardized reclassification of the generalized hierarchy 450. For example, the trace 410a's Level 2 CAPABILITY-classified requirements are stored in the hierarchy 450's corresponding Level 2 (HIGH-LEVEL BUSINESS REQUIREMENTS). Similarly, trace 410a's Level 4 SYSTEM REQUIREMENTS-classified requirements are stored in the hierarchy 450's corresponding Level 4 (HIGH-LEVEL SYSTEM REQUIREMENTS).

Each Agile-compliant requirement of trace 410b is mapped onto a corresponding level of generalized hierarchy 450 in the same way. For example, trace 410b's Level 3 FEATURE requirements are stored at the hierarchy 450's corresponding Level 3 (LOW-LEVEL BUSINESS REQUIREMENTS) and trace 410b's Level 5 USER STORY requirements are stored at the hierarchy 450's corresponding Level 5 (LOW-LEVEL SYSTEM REQUIREMENTS.

Requirements extracted from other types of structured traces 410 are added to the generalized hierarchy 450 in the same way. The final result of this process is a holistic generalized hierarchy in which all received requirements have been organized into a common, standardized reclassification scheme.

Generalized hierarchy 450 may comprise multiple data elements for each stored requirement. For example, a stored requirement may itself comprise a data structure that includes: a unique requirement identifier, identifiers of linkages to parent and child requirements, a classification label, a granularity-level identifier, a revision history, a time stamp, and a textual statement of the requirement itself.

As explained in FIGS. 4-5, components of system 4000 know how to perform these mappings by referring to rules stored in the normalization configuration file 440. These rules note, for example, that traces received from the source of trace 410a conform to a five-classification structure, that the five classifications comply with the classification-labeling convention shown in FIG. 6A, and that each classification identifies a degree of granularity that corresponds to a specific level of the generalized hierarchy 450. A similar set of stored rules specify similar characteristics of the classification system used for traces similar to trace 410b.

Examples 6A and 6B should not be construed to imply a requirement that all traces related to a particular project organize requirements into the same number of classifications, or that any traces must use classification labels similar to those used by other traces. Nor should this simple example be interpreted as indicating a preference for a certain number of classifications or granularity levels. Embodiments of the present invention may defined a generalized set of classifications that is labeled in any manner desired by an implementer and that comprises any number of levels desired by an implementer. Embodiments may also be configured to extract requirements from received traces 410 or 420 that comprise any number of classifications or that use any sort of classification labels known in the art.

FIG. 6B illustrates an exemplary mapping of requirements extracted from structured traces 420 onto a generalized requirements hierarchy 450, in accordance with embodiments of the present invention. FIG. 6B shows items 4000, 420, 430, and 450.

The mapping procedure of FIG. 6B is similar to that of FIG. 6A. As in FIG. 6A, a set of classified requirements and related information extracted from a received trace are stored in corresponding levels of a generalized requirements hierarchy 450.

However, when the received trace is an unstructured trace 420, the requirements, classifications, and other information cannot be directly retrieved from the trace 420 by N&I engine 400 through a simple procedure like a database query or a data-structure load. Instead, an inferential, sometimes cognitive or artificially intelligent, procedure must be performed by an NLP-classification service or module 430. This procedure entails analyzing the unstructured natural language of trace 410b, identifying which text or keywords correspond to requirements, classifications, and related information, and then extracting that information in a form similar to that of information that is extracted directly from structured traces 410.

As explained in FIGS. 4-5, classification module 430 performs this procedure by referring to rules stored in its own internal knowledgebase or in a shared normalization configuration file 440. These rules allow classifier 430 to begin analyzing an unstructured trace 420 with knowledge of a classification scheme that is meaningful to the project and to the entity that was the source of the trace 420.

As with requirements extracted from structured traces 410a-410b, the requirements extracted by classification module 430 from unstructured trace 420 are added to the generalized hierarchy 450. As in the example of FIG. 5A, the stored rules associate the granularity level of each classification of trace 420 with a corresponding standardized granularity level of the generalized hierarchy 450. The procedure for integrating information inferred by classification module 430 from unstructured trace 420 into hierarchy 450 is thus analogous to the procedure for integrating information retrieved from structured traces 410 into hierarchy 450.

Requirements from both the structured traces 410 and the unstructured traces 420 are thus merged into the generalized hierarchy 450 and are all normalized to the same generalized classification scheme. Differences between each trace's classification and granularity conventions are reconciled and normalized and, once a requirement is integrated into the generalized hierarchy 450, the original source of each requirement is no longer apparent.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A requirements-management system comprising:
a processor, a memory coupled to the processor, and a computer-readable hardware storage device coupled to the processor, the storage device containing program code configured to be run by the processor via the memory to implement a method for a requirements-management system with a holistic traceability tree, the method comprising:
the system receiving a set of trace documents that each contains information describing and classifying at least one requirement of a planned project, and that each uses a distinct classification scheme to classify requirements;
the system extracting, from each received document of the set of trace documents, a set of requirements, a classification of each extracted requirement that conforms to a classification scheme used by the received document, and a list of parent-child relationships between pairs of the extracted requirements;
the system reclassifying all classified requirements extracted from the set of trace documents into a standardized reclassification scheme, where the standardized reclassification scheme organizes requirements as a function of the requirements' relative degrees of granularity;
the system organizing the reclassified requirements into a generalized hierarchy as a function of each requirement's standardized reclassification,
where each class of the standardized reclassification scheme determines a level of the generalized hierarchy into which requirements are located,
where nodes of the hierarchy are organized into a predetermined number of levels,
where a first path, of the generalized hierarchy, that extends from a root node of the generalized hierarchy down to a first leaf node of the generalized hierarchy represents a requirement definition that contains neither a hanger requirement nor an orphan requirement if the first path contains exactly one node at each level of the predetermined number of levels,
where a second path, from the root node down to a second leaf node of the generalized hierarchy, represents a requirement definition in which the second leaf node represents a hanger requirement if the second leaf node is not located at a lowest level of the predetermined number of levels, and
where a third path of the generalized hierarchy represents a requirement definition in which a highest-level node of the third path represents an orphan requirement if the highest-level node is not the root node; and
the system translating the generalized hierarchy into a traceability tree data structure,
where the traceability tree is configured to facilitate integration of the traceability tree into a downstream component of a project-management application, and
where the traceability tree is configured to allow a lineage of a requirement to be bidirectionally traced between a root node of the traceability tree and a leaf node of the traceability tree.

2. The system of claim 1, further comprising:
the system determining whether a first document of the set of trace documents is an unstructured document and, in response to determining that the first document is an unstructured document, inferring from unstructured text of the first document: a first set of requirements, a classification of each requirement of the first set of requirements that conforms to a first classification scheme used by the first document, and a list of parent-child relationships between pairs of the first set of requirements, where the system performs the inferring by referring to stored rules that describe characteristics of the first classification scheme.

3. The system of claim 1, where the reclassifying further comprises:
the system mapping a classification of a first extracted requirement onto a corresponding reclassification of the standardized reclassification scheme; and
the system assigning the first extracted requirement to a level of the generalized hierarchy that is associated with the corresponding reclassification,
where the mapping and the assigning are performed in compliance with normalization rules that relate the standardized reclassification scheme to classification schemes used by the set of trace documents.

4. The system of claim 2, where the inferring is a cognitive procedure performed by an artificially intelligent software application.

5. The system of claim 2, where the inferring is performed by a self-learning software application that is trained by analyzing results of prior performances of the inferring.

6. The system of claim 1,
where a highest-level class of the standardized reclassification scheme identifies a broadest class of requirement that is associated with a lowest degree of granularity and is represented by a root node of the generalized hierarchy, and
where a lowest-level class of the standardized reclassification scheme identifies a most-detailed class of requirements that are each associated with a highest degree of granularity and that are each represented by a leaf node of the generalized hierarchy.

7. The system of claim 1, further comprising:
the system detecting an availability of an additional trace document that contains information describing a revised version of a previously extracted requirement;
the system generating a reclassified revised version of the previously extracted requirement by performing the receiving, the extracting, and the reclassifying upon the additional trace document;
the system adding the reclassified revised version of the previously extracted requirement to the generalized hierarchy; and
the system updating the traceability tree to allow access both to the previous version of the previously extracted requirement and to the reclassified revised version of the previously extracted requirement.

8. A method comprising:
receiving, using a requirements-management system, a set of trace documents that each contains information describing and classifying at least one requirement of a planned project, and that each uses a distinct classification scheme to classify requirements;
extracting, using the system, from each received document of the set of trace documents, a set of requirements, a classification of each extracted requirement that conforms to a classification scheme used by the received document, and a list of parent-child relationships between pairs of the extracted requirements;
reclassifying, using the system, all classified requirements extracted from the set of trace documents into a standardized reclassification scheme, where the standardized reclassification scheme organizes requirements as a function of the requirements' relative degrees of granularity;
organizing, using the system, the reclassified requirements into a generalized hierarchy as a function of each requirement's standardized reclassification,
where each class of the standardized reclassification scheme determines a level of the generalized hierarchy into which requirements are located,
where nodes of the hierarchy are organized into a predetermined number of levels,
where a first path, of the generalized hierarchy, that extends from a root node of the generalized hierarchy down to a first leaf node of the generalized hierarchy represents a requirement definition that contains neither a hanger requirement nor an orphan requirement if the first path contains exactly one node at each level of the predetermined number of levels,
where a second path, from the root node down to a second leaf node of the generalized hierarchy, represents a requirement definition in which the second leaf node represents a hanger requirement if the second leaf node is not located at a lowest level of the predetermined number of levels, and
where a third path of the generalized hierarchy represents a requirement definition in which a highest-level node of the third path represents an orphan requirement if the highest-level node is not the root node; and
translating, using the system, the generalized hierarchy into a traceability tree data structure,
where the traceability tree is configured to facilitate integration of the traceability tree into a downstream component of a project-management application, and
where the traceability tree is configured to allow a lineage of a requirement to be bidirectionally traced between a root node of the traceability tree and a leaf node of the traceability tree.

9. The method of claim 8, further comprising:
the system determining whether a first document of the set of trace documents is an unstructured document and,
in response to determining that the first document is an unstructured document, inferring from unstructured text of the first document: a first set of requirements, a classification of each requirement of the first set of requirements that conforms to a first classification scheme used by the first document, and a list of parent-child relationships between pairs of the first set of requirements, where the system performs the inferring by referring to stored rules that describe characteristics of the first classification scheme.

10. The method of claim 8, where the reclassifying further comprises:
the system mapping a classification of a first extracted requirement onto a corresponding reclassification of the standardized reclassification scheme; and
the system assigning the first extracted requirement to a level of the generalized hierarchy that is associated with the corresponding reclassification,
where the mapping and the assigning are performed in compliance with normalization rules that relate the standardized reclassification scheme to classification schemes used by the set of trace documents.

11. The method of claim 9, where the inferring is performed by a self-learning software application that is trained by analyzing results of prior performances of the inferring.

12. The method of claim 8,
where a highest-level class of the standardized reclassification scheme identifies a broadest class of requirement that is associated with a lowest degree of granularity and is represented by a root node of the generalized hierarchy, and
where a lowest-level class of the standardized reclassification scheme identifies a most-detailed class of requirements that are each associated with a highest degree of granularity and that are each represented by a leaf node of the generalized hierarchy.

13. The method of claim 8, further comprising:
the system detecting an availability of an additional trace document that contains information describing a revised version of a previously extracted requirement;
the system generating a reclassified revised version of the previously extracted requirement by performing the receiving, the extracting, and the reclassifying upon the additional trace document;
the system adding the reclassified revised version of the previously extracted requirement to the generalized hierarchy; and
the system updating the traceability tree to allow access both to the previous version of the previously extracted requirement and to the reclassified revised version of the previously extracted requirement.

14. The method of claim 8, further comprising providing at least one support service for at least one of creating, integrating, hosting, maintaining, and deploying computer-readable program code in the computer system, wherein the computer-readable program code in combination with the computer system is configured to implement the receiving, the extracting, the reclassifying, the organizing, and the translating.

15. A computer program product, comprising:
a computer-readable hardware storage device having a computer-readable program code stored therein, the program code configured to be executed by a requirements-management system comprising a processor, a memory coupled to the processor, and a computer-readable hardware storage device coupled to the processor, the storage device containing program code configured to be run by the processor via the memory to implement a method for a requirements-management system with a holistic traceability tree, the method comprising:
the system receiving a set of trace documents that each contains information describing and classifying at least one requirement of a planned project, and that each uses a distinct classification scheme to classify requirements;
the system extracting, from each received document of the set of trace documents, a set of requirements, a classification of each extracted requirement that conforms to a classification scheme used by the received document, and a list of parent-child relationships between pairs of the extracted requirements;
the system reclassifying all classified requirements extracted from the set of trace documents into a standardized reclassification scheme, where the standardized reclassification scheme organizes requirements as a function of the requirements' relative degrees of granularity;
the system organizing the reclassified requirements into a generalized hierarchy as a function of each requirement's standardized reclassification,
where each class of the standardized reclassification scheme determines a level of the generalized hierarchy into which requirements are located,
where nodes of the hierarchy are organized into a predetermined number of levels,
where a first path, of the generalized hierarchy, that extends from a root node of the generalized hierarchy down to a first leaf node of the generalized hierarchy represents a requirement definition that contains neither a hanger requirement nor an orphan requirement if the first path contains exactly one node at each level of the predetermined number of levels,
where a second path, from the root node down to a second leaf node of the generalized hierarchy, represents a requirement definition in which the second leaf node represents a hanger requirement if the second leaf node is not located at a lowest level of the predetermined number of levels, and
where a third path of the generalized hierarchy represents a requirement definition in which a highest-level node of the third path represents an orphan requirement if the highest-level node is not the root node; and
the system translating the generalized hierarchy into a traceability tree data structure,
where the traceability tree is configured to facilitate integration of the traceability tree into a downstream component of a project-management application, and
where the traceability tree is configured to allow a lineage of a requirement to be bidirectionally traced between a root node of the traceability tree and a leaf node of the traceability tree.

16. The computer program product of claim 15, further comprising:
the system determining whether a first document of the set of trace documents is an unstructured document and,
in response to determining that the first document is an unstructured document, inferring from unstructured text of the first document: a first set of requirements, a classification of each requirement of the first set of requirements that conforms to a first classification scheme used by the first document, and a list of parent-child relationships between pairs of the first set of requirements, where the system performs the inferring by referring to stored rules that describe characteristics of the first classification scheme.

17. The computer program product of claim 15, where the reclassifying further comprises:
the system mapping a classification of a first extracted requirement onto a corresponding reclassification of the standardized reclassification scheme; and
the system assigning the first extracted requirement to a level of the generalized hierarchy that is associated with the corresponding reclassification,
where the mapping and the assigning are performed in compliance with normalization rules that relate the standardized reclassification scheme to classification schemes used by the set of trace documents.

18. The computer program product of claim 16, where the inferring is performed by a self-learning software application that is trained by analyzing results of prior performances of the inferring.

19. The computer program product of claim 15,
where a highest-level class of the standardized reclassification scheme identifies a broadest class of requirement that is associated with a lowest degree of granularity and is represented by a root node of the generalized hierarchy, and where a lowest-level class of the standardized reclassification scheme identifies a most-detailed class of requirements that are each associated with a highest degree of granularity and that are each represented by a leaf node of the generalized hierarchy.

20. The computer program product of claim 15, further comprising:

the system detecting an availability of an additional trace document that contains information describing a revised version of a previously extracted requirement;

the system generating a reclassified revised version of the previously extracted requirement by performing the receiving, the extracting, and the reclassifying upon the additional trace document;

the system adding the reclassified revised version of the previously extracted requirement to the generalized hierarchy; and the system updating the traceability tree to allow access both to the previous version of the previously extracted requirement and to the reclassified revised version of the previously extracted requirement.

\* \* \* \* \*